H. GINDELE.
PHOTOGRAPHIC FILM CARTRIDGE.
APPLICATION FILED SEPT. 14, 1915.

1,212,137.

Patented Jan. 9, 1917.
2 SHEETS—SHEET 1.

Witnesses
J. W. Michael, Jr.
C. L. Young

Inventor
Harrison Gindele
By Edson Bros.
Attorney

H. GINDELE.
PHOTOGRAPHIC FILM CARTRIDGE.
APPLICATION FILED SEPT. 14, 1915.
1,212,137.
Patented Jan. 9, 1917.
2 SHEETS—SHEET 2.
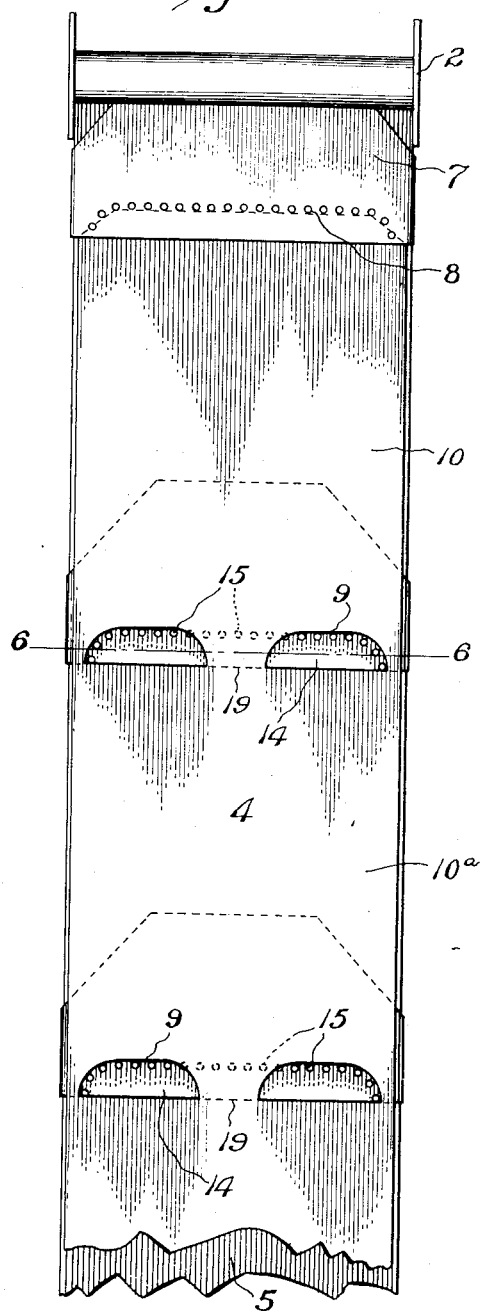
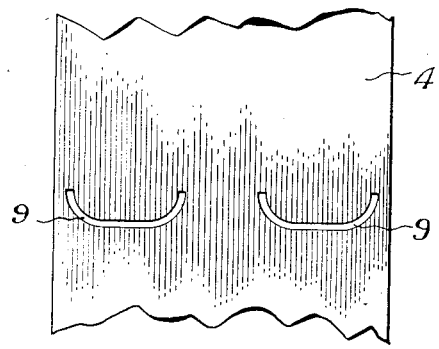
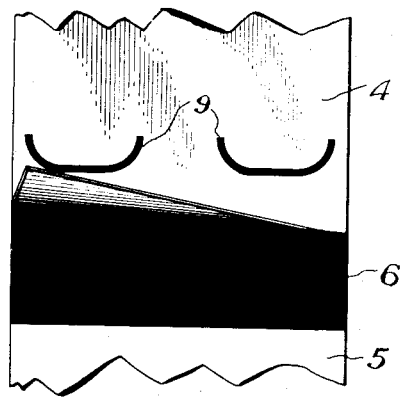
Witnesses
J. W. Michael, Jr.
E. L. Young.
Inventor
Harrison Gindele
By Edson Bros.
Attorney

UNITED STATES PATENT OFFICE.

HARRISON GINDELE, OF CINCINNATI, OHIO.

PHOTOGRAPHIC-FILM CARTRIDGE.

1,212,137.   Specification of Letters Patent.   Patented Jan. 9, 1917.

Application filed September 14, 1915. Serial No. 50,586.

*To all whom it may concern:*

Be it known that I, HARRISON GINDELE, a citizen of the United States, residing at Cincinnati, in the county of Hamilton and State of Ohio, have invented certain new and useful Improvements in Photographic-Film Cartridges; and I do hereby declare the following to be a full, clear, and exact description of the invention, such as will enable others skilled in the art to which it appertains to make and use the same.

In photographic film cartridges for daylight loading cameras or roll holders embodying a strip of sensitized film protected by a covering strip containing means to indicate separate exposures and points of severance of the film into separate exposures, it has been found difficult, if not impracticable, to remove a particular exposed portion from the film strip for development and thereafter to permit of future exposures on the remaining portion of the film strip.

This invention is a photographic film cartridge having for its object to permit of the removal of one or more exposures from the cartridge without the necessity of removing an unexposed portion of the film from the cartridge or the camera, and to thereafter permit of the exposing of the remaining portion of the film strip within the camera in like manner as though no part of the strip had been removed.

To this end, the invention comprises certain improvements to be more particularly hereinafter described, the novel features of which will be pointed out in the appended claims.

While an embodiment of the invention is shown in the accompanying drawings, it is to be understood that such disclosure is for the purposes of illustration only, and not as defining the limits of the invention.

Figure 1:
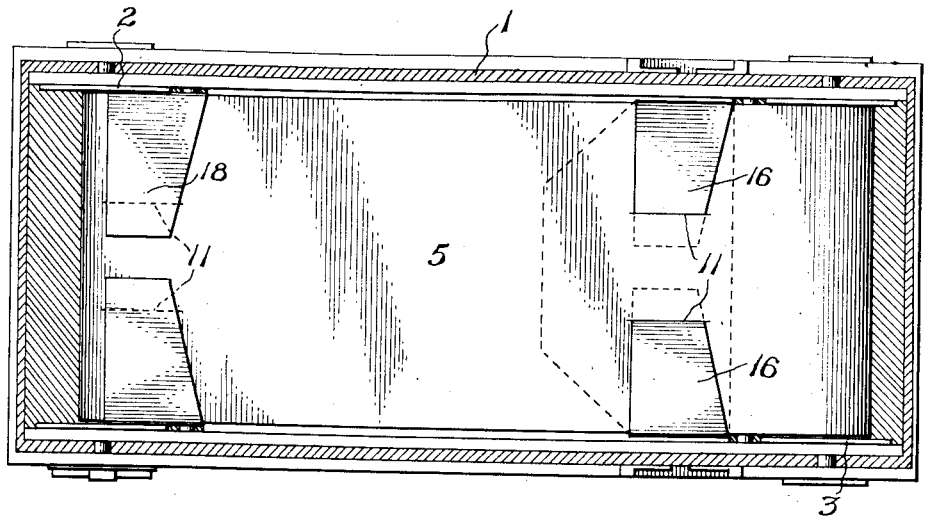
Figure 5:
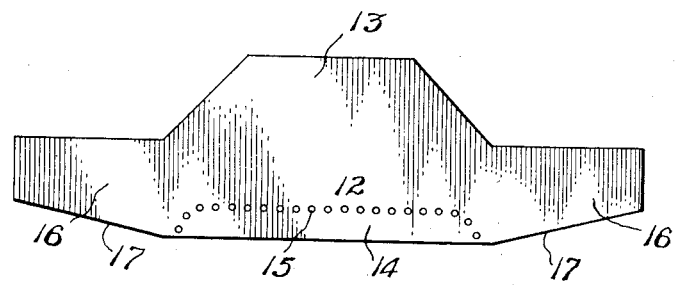
Figure 6:
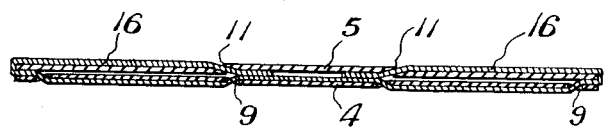

In the drawings:—Figure 1 is a plan view, parts being in section, illustrating a film cartridge embodying the invention mounted within a camera. Fig. 2 is a plan view disclosing a portion of the film mounted on its covering strip. Fig. 3 is a detail view of a portion of the film disclosing apertures or slots formed therein. Fig. 4 is a detail view of the film provided with a transfer strip. Fig. 5 is a detail view of one of the film engaging elements, and Fig. 6 is an enlarged sectional view taken through the film on the line 6—6 of Fig. 2.

Referring more particularly to the embodiment of the invention disclosed in the accompanying drawings, the camera is indicated at 1 and may be of any preferred form, and is shown provided with a film spool 2 at one end thereof and a similar spool 3 at the other end.

The film cartridge may be of any preferred type for daylight loading cameras wherein the sensitized film indicated at 4 is protected by a longer strip of covering material, indicated at 5. It may also embody that type of film cartridge employing an autographic strip indicated at 6 and disclosed in Fig. 4.

The sensitized film 4 is preferably secured to the covering strip 5 at one end, preferably that end adjacent to the winding spool 2, as is usual in photographic films which are adapted to receive a plurality of exposures. At this end 7 of the film, there may be provided a suitable tab having perforations 8 which substantially register with the end of the film 4 to permit the film to be readily torn from the end tab 7. The end of the film may be cut in any preferred form, however.

Referring more particularly to Figs. 2 and 3, the film is shown provided with slots 9, which may be arcuate in form, a plurality of said slots being shown spaced across the film. These slots are preferably arranged intermediate the ends of the film, and preferably at the end of that portion of the film which is designed to form an exposure, so that the groups of slots 9 may be so positioned that they form separate negatives 10 throughout the film strip 4. It is preferred to form the separating elements 9 as slots instead of slits, for the reason that they reduce the thickness of the material at such points.

The covering strip 5 may be provided with slits 11 which may be substantially transverse to the slots 9 of the film 4. In this connection, it is to be understood that the covering strip 5 is preferably of greater length than the sensitized film strip, as is usual in film cartridges of this character.

Coöperating with the covering strip 5 and the film strip 4 is a film engaging element which is more clearly illustrated in Fig. 5. This element is shown comprising a central member 12, a central securing tab 13 which may have one face thereof provided with adhesive material, a section 14, which may be removed from the body portion by tearing the same at the perforated line 15, and a plurality of end securing tabs 16.

The part 14 may be removed from the body portion 12 by any other suitable means than by the perforations 15. The tabs 16 as well as the portion 14 may be provided with an adhesive substance on one surface thereof. The tabs 16 are shown provided with an oblique edge 17, and these tabs 16 are designed to have their ends passed through the slits 11 of the covering strip 5 wherein the inclined edge 17 will serve to position the edge of the member 14 beyond the termination of the slit 11. By this arrangement, the film engaging element may be loosely mounted between the film strip 4 and the covering strip 5, and retained in a predetermined position by the tabs 16 engaging the slits 11 and thereby protect the sensitized film from exposure or fogging due to rays filtering through the inspection window of the camera. It will be observed that the tabs 16 therefor maintain the film engaging element in its relative position when it is inoperatively mounted on the strip, although it is preferred to pass the member 14 through the slots 9 as shown in Fig. 2 and to secure the film 4 to this member 14. In films of this character, it is difficult to secure an ordinary adhesive paper strip to the non-sensitized surface of the film strip, but such adhesive material will readily adhere to the sensitized surface of the strip. For this reason, the slots 9 are provided to permit the gummed member 14 to extend through the slots 9 to engage a portion of the sensitized surface of the film 4.

Assuming that an exposure has been made on the first or second section of the film strip, but the remainder of the strip has not been exposed, the photographer may take the camera to a dark room, loosen the spool 2, unroll the film therefrom until he exposes the end 7 of the film strip, whereupon he will remove the tabs 16 from the slots 9, and paste them to the back or outer face of the casing strip 5, as indicated at 18 in Fig. 1, thereby covering the slits 11. If the autographic slip 6 is employed, the gummed surface of the central tab 13 may be secured to such slip, otherwise such surface will be secured to the under face of the covering strip 5. It is preferred to secure the removable film strip 14 to the film when the film is prepared at the factory, thereby relieving the user of the necessity of performing this operation. After the film engaging element has been thus secured to the film at 14, the covering strip at 18 and to the autographic strip or covering strip at 13, the sensitized film may be torn from the covering strip 5 by means of the perforations at 8, or the perforations at 15, and cut or torn on the line 19 to remove the exposed portion of the film from the film strip. Thereafter, the spool 2 may be reinserted into the camera, the remaining unexposed portion of the film may be exposed in the usual manner, and such film portion on the roll holder may be thereafter developed by any of the usual methods, including the tank development.

An intermediate film section may be removed in the same manner, such as section 10$^a$, Fig. 2, wherein the free end of the previous section may be held in position for tank development by employing a gummed or adhesive portion of the film engaging element at that end to secure the previous section to the covering strip.

Having explained the nature of the invention and described a construction embodying the same in the best form now known to me, I claim and desire to secure by Letters Patent of the United States, protection for all the novelty herein disclosed to which I may be entitled under the statutes, and the following claiming clauses are to be interpreted broadly to give effect to this intention:

1. A film cartridge embodying a flexible photographic film, a covering strip of flexible material longer than the film and attached to one end of the latter, and a film-engaging element independent of, and adapted to be interposed between the film and the cover strip and to be secured to the film and covering strip.

2. A film cartridge embodying a photographic film, a covering strip longer than the film having a slot and attached to one end of the latter, and a film engaging element independent of, and adapted to be interposed between the film and covering strip and to be secured to the film and covering strip at a predetermined point intermediate the ends of the film with a portion of the film engaging elements extending through the slot to be secured to the face of the film.

3. A film cartridge embodying a covering strip, a photographic film attached at one end of said covering strip, and a film engaging element independent of the film and covering strip, and adapted to be interposed between the film and covering strip, said element comprising means to be secured to the outer face of the covering strip and to the sensitized face of the film.

4. A film cartridge embodying a covering strip, a photographic film attached at one end of said strip and provided with an aperture formed therethrough, and a film engaging element adapted to be positioned between the film and covering strip and to have a portion thereof extend through the aperture of said film and another portion adapted to be secured to the inner and outer faces of the covering strip.

5. A film cartridge embodying a covering strip, a photographic film having a curved aperture formed therethrough, and a film engaging element positioned between said covering strip and said film and adapted to have a portion thereof extend through the aperture of the film and an adhesive portion thereof secured to the covering strip.

6. A film cartridge embodying a covering strip, a photographic film and a film engaging element independent of the film and covering strip, said film engaging element comprising a central member having a central tab adapted to be secured to the inner face of the covering strip and a removable section adapted to be secured to the film.

7. A film cartridge embodying a covering strip, a photographic film, and a film engaging element independent of the film and covering strip, said film engaging element comprising a central member having a central securing tab, a removable section adapted to be secured to the film, and an end securing tab.

8. A film cartridge embodying a photographic film, a covering strip having a slit formed therein intermediate its ends, and a film engaging element independent of the film and covering strip, said film engaging element including an end securing tab adapted to extend through the slit of the covering strip to maintain said tab in its inoperative position.

9. A film cartridge embodying a photographic film, a covering strip having a plurality of slits formed therein intermediate its ends, and a film engaging element positioned between the film and covering strip, said film engaging strip including a plurality of end securing tabs having an angularly cut edge, said tabs being adapted to extend through the slits of the covering strip to maintain the tabs in their inoperative position and retain the film engaging element in a position to protect the film from exposure through the slits of the covering strip.

In testimony whereof, I affix my signature, in presence of two witnesses.

HARRISON GINDELE.